US005602834A

United States Patent [19]

Dean et al.

[11] Patent Number: 5,602,834
[45] Date of Patent: Feb. 11, 1997

[54] LINEAR COVERAGE AREA ANTENNA SYSTEM FOR A CDMA COMMUNICATION SYSTEM

[75] Inventors: Richard F. Dean, Boulder, Colo.; Franklin P. Antonio, Del Mar, Calif.

[73] Assignee: QUALCOMM Incorporated, San Diego, Calif.

[21] Appl. No.: 483,111

[22] Filed: Jun. 7, 1995

Related U.S. Application Data

[63] Continuation-in-part of Ser. No. 112,392, Aug. 27, 1993, Pat. No. 5,513,176, which is a continuation-in-part of Ser. No. 849,651, Mar. 9, 1992, Pat. No. 5,280,472, which is a continuation of Ser. No. 624,118, Dec. 7, 1990, abandoned.

[51] Int. Cl.$^6$ ............................... H04B 7/26; H04Q 7/36
[52] U.S. Cl. ...................... 370/335; 375/200; 455/276.1; 455/278.1
[58] Field of Search ............................... 370/18; 375/200, 375/205, 347; 455/276.1, 277.2, 278.1, 279.1, 283; 342/375, 433, 434; 343/844, 853

[56] References Cited

U.S. PATENT DOCUMENTS

| | | | |
|---|---|---|---|
| 4,383,327 | 5/1983 | Timor | 370/93 |
| 4,672,605 | 6/1987 | Hustig et al. | 370/76 |
| 4,672,658 | 6/1987 | Kavehrad et al. | 379/63 |
| 4,761,778 | 8/1988 | Hui | 370/60 |
| 4,820,036 | 4/1989 | Smith | 455/179 |
| 4,841,527 | 6/1989 | Raychaudhuri | 371/32 |
| 4,866,732 | 9/1989 | Carey et al. | 375/1 |
| 4,866,733 | 9/1989 | Morishita | 375/1 |
| 4,901,307 | 2/1990 | Gilhousen | 320/18 |
| 4,914,675 | 4/1990 | Iwamatsu et al. | 375/102 |
| 4,920,348 | 4/1990 | Baghdady | 342/433 |
| 4,984,247 | 1/1991 | Kaufmann et al. | 375/1 |
| 5,018,165 | 5/1991 | Sohner et al. | 375/1 |
| 5,046,066 | 9/1991 | Messenger | 370/94.1 |

(List continued on next page.)

FOREIGN PATENT DOCUMENTS

| | | | |
|---|---|---|---|
| 0419429 | 3/1991 | European Pat. Off. | H04B 7/02 |
| 2237706 | 5/1991 | United Kingdom | H04B 7/04 |

OTHER PUBLICATIONS

Vendor Data Sheet, "Flexwell Radiating Cable", of Radio Frequency Systems, Inc. by Cablewave Systems Divison, 1993, 22 pages.
Vendor Data Sheet, "TRC500–FR, Tiaxial Antenna Cable", of Times Microwave Systems, Jul. 1993, 6 pages.
Vendor Data Sheet, "Distributed Communications Equipment and System Design", of Andrew Tunnel Systems, pp. 424–453.
Preben E. Mogensen, "GSM Base–Station Antenna Diversity Using Soft Decision Combining on Up–link and Delayed–Diagonal Transmission on Down–link", *43rd IEEE Vehicular Technology Conference*, May 18, 1993, pp. 611–616.

*Primary Examiner*—Melvin Marcelo
*Attorney, Agent, or Firm*—Russell B. Miller; Sean English

[57] ABSTRACT

A linear coverage area antenna system for use within a CDMA communication system is described. In a preferred implementation, two linear coverage area antenna structures are positioned in parallel and coupled to a base station. Within the base station, a transmitter generates remote user directed spread spectrum signals, these signals being provided to the first and second linear coverage area antenna structures through an antenna interface. The antenna interface includes a time delay element for introducing a predetermined time delay between components of the remote user directed spread spectrum signals transmitted by the first and second linear coverage area antenna structures, respectively. The base station also further includes at least a first demodulation element for demodulating an aggregate spread spectrum signal comprised of a plurality of system user directed spread spectrum signals received by the first linear coverage area antenna structure and a second demodulation element for demodulating a second aggregate spread spectrum signal comprised of a plurality of system user directed spread spectrum signals received by the second linear coverage area antenna structure.

28 Claims, 7 Drawing Sheets

U.S. PATENT DOCUMENTS

| | | | |
|---|---|---|---|
| 5,056,109 | 10/1991 | Gilhousen et al. | 375/1 |
| 5,073,900 | 12/1991 | Mallinckrodt | 375/1 |
| 5,101,501 | 3/1992 | Gilhousen et al. | 375/1 X |
| 5,103,459 | 4/1992 | Gilhousen et al. | 375/1 |
| 5,280,472 | 1/1994 | Gilhousen et al. | 370/18 |
| 5,289,499 | 2/1994 | Weerackody | 370/18 X |
| 5,347,535 | 9/1994 | Karasawa et al. | 375/1 |
| 5,442,627 | 8/1995 | Viterbi et al. | 375/205 |
| 5,480,165 | 2/1996 | Blakeney, II et al. | 375/205 |
| 5,506,865 | 4/1996 | Weaver, Jr. | 375/205 |
| 5,513,176 | 4/1996 | Dean et al. | 370/18 |

LINEAR COVERAGE AREA ANTENNA SYSTEM FOR A CDMA COMMUNICATION SYSTEM

The present application is a continuation-in-part application of U.S. patent application Ser. No. 08/112,392, filed Aug. 27, 1993, entitled "DUAL DISTRIBUTED ANTENNA SYSTEM", now U.S. Pat. No. 5,513,176, which is a continuation-in-part application of U.S. patent application Ser. No. 07/849,651, filed Mar. 9, 1992, entitled "CDMA MICROCELLULAR TELEPHONE SYSTEM AND DISTRIBUTED ANTENNA SYSTEM THEREFOR", which issued as U.S. Pat. No. 5,280,472 on Jan. 18, 1994, which is a continuation of U.S. patent application Ser. No. 07/624,118, filed Dec. 7, 1990, of the same title now abandoned.

BACKGROUND OF THE INVENTION

I. Field of the Invention

The present invention relates to communication systems, particularly indoor communication systems including cellular telephones, personal communication services (PCS), wireless private branch exchange (PBX) and wireless local loop telephone systems. More specifically, the present invention relates to a novel and improved distributed coaxial antenna for microcellular communication systems to facilitate indoor communications using spread spectrum signals.

II. Description of the Related Art

The use of code division multiple access (CDMA) modulation techniques is one of several techniques for facilitating communications in which a large number of system users are present. Other multiple access communication system techniques, such as frequency hopping spread spectrum, time division multiple access (TDMA), frequency division multiple access (FDMA), and amplitude modulation schemes such as amplitude companded single sideband (ACSSB) are known in the art. However the spread spectrum modulation technique of CDMA has significant advantages over the other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, which is herein incorporated by reference.

In the just mentioned patent, a multiple access technique is disclosed where a large number of mobile telephone system users each having a transceiver communicate through satellite repeaters or terrestrial base stations (also referred to as cell-sites stations, cell-sites, or for short, cells) using CDMA spread spectrum communication signals. In using CDMA communications, the frequency spectrum can be reused multiple times. The use of CDMA results in a much higher spectral efficiency than can be achieved using other multiple access techniques thus permitting an increase in system user capacity.

The terrestrial channel experiences signal fading that is characterized by Rayleigh fading. The Rayleigh fading characteristic in the terrestrial channel signal is caused by the signal being reflected from many different features of the physical environment. As a result, a signal arrives at a mobile unit receiver from many directions with different transmission delays. At the UHF frequency bands usually employed for mobile radio communications, including those of cellular mobile telephone systems, significant phase differences in signals traveling on different paths may occur. The possibility for destructive summation of the signals may result in occasional deep fades.

Terrestrial channel fading is a very strong function of the physical environment of the mobile unit. A small change in position of the mobile unit or in the environment may change the physical delays of all the signal propagation paths, which further results in a different phase for each path. Thus for example, the motion of the mobile unit through the environment can result in a quite rapid fading process. For example, in the 850 MHz cellular radio frequency band, fading can typically occur as fast as one fade per second per mile per hour of vehicle speed. Fading this severe can be extremely disruptive to signals in the terrestrial channel resulting in poor communication quality. Additional transmitter power can be used to overcome the problem of fading. However, such an increase in power adversely effects both the user by excessive power consumption and the system by increased interference.

In a CDMA communication system, the same wideband frequency channel can be used for communication by all base stations. Typically in a FDMA scheme one frequency band is assigned to only one communication link, e.g. from the base station to one mobile unit. However in a CDMA system, the CDMA waveform properties that provide processing gain are also used to discriminate between signals that occupy the same frequency band. Furthermore the high speed pseudorandom noise (PN) modulation allows many different propagation paths of a common signal to be separately demodulated at the receiving unit, provided the difference in path delays exceeds the PN chip duration, i.e. 1/bandwidth. If a PN chip rate of approximately 1 MHz is employed in a CDMA system, the full spread spectrum processing gain, equal to the ratio of the spreading bandwidth to system data rate, can be employed to discriminate against paths that differ by more than one microsecond in path delay from each other. A one microsecond path delay differential corresponds to differential path distance of approximately 1,000 feet. The urban environment typically provides differential path delays in excess of one microsecond, and up to 10–20 microseconds are reported in some areas.

In narrow band modulation systems such as the analog FM modulation employed by conventional telephone systems, the existence of multiple paths results in severe multipath fading. The only solution to fading in an FM system is to increase the transmission power. With wideband CDMA modulation, however, the different paths may be discriminated against in the demodulation process. This discrimination can be used to greatly reduce the severity of multipath fading.

It is desirable in the such communication systems that some form of diversity be provided which would permit a system to further reduce the effects of fading. Diversity is one approach for mitigating the deleterious effects of fading. Three major types of diversity exist: time diversity, frequency diversity, and space diversity.

Time diversity can best be obtained by the use of repetition, time interleaving, and error detection and correction coding which is a form of repetition. The present invention may employ each of these techniques as a form of time diversity. Because CDMA is inherently wideband, CDMA offers a form of frequency diversity because the signal energy is spread over a wide bandwidth. Therefore, frequency selective fading may affect only a small part of the CDMA signal bandwidth.

Space or path diversity is obtained by providing multiple signal paths through simultaneous links between a mobile unit and two or more base stations. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention.

The deleterious effects of fading can be further controlled to a certain extent by controlling transmitter power. A fade which decreases the power received by the base station from the mobile unit can be compensated for by increasing the power transmitted by the mobile unit. The power control function operates in accordance with a time constant. Depending on the time constant of the power control loop and the duration of a fade, the system may be able to compensate for the fade by increasing transmit power of the mobile unit. A system for base station and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", also assigned to the assignee of the present invention.

The existence of a plurality of spatially different paths can provide space diversity to a wideband CDMA system. If two or more spatially different paths (such as provided by two spatially separated antennas) are available with differential path delay greater than one chip duration, two or more demodulation elements within a common receiver can be employed to separately demodulate the signals at a single base station or mobile unit. Because these signals typically exhibit independence in multipath fading, i.e., they usually do not fade together, the outputs of the two demodulation elements can be diversity combined in order to mitigate the adverse effects of fading. Therefore a loss in performance only occurs when both paths experience fades at the same time. Hence, one aspect of the present invention is the provision of two or more demodulation elements in combination with a diversity combiner.

In order to use multiple demodulation elements, it is necessary to utilize a waveform that is not only orthogonal to other signals in the system but is orthogonal with a delayed version of the same signal. A method and system for constructing PN sequences that provide orthogonality between the users so that mutual interference is reduced is disclosed in U.S. Pat. No. 5,103,459, issued Apr. 7, 1992, entitled "SYSTEM AND METHOD FOR GENERATING SIGNAL WAVEFORMS IN A CDMA CELLULAR MOBILE TELEPHONE SYSTEM", also assigned to the assignee of the present invention. Using these techniques in reducing mutual interference allows higher system user capacity and better link performance. With orthogonal PN codes, the cross-correlation between the codes is zero over a predetermined time interval, resulting in no interference between the orthogonal codes.

In cellular telephone systems, a large geographic area is provided with mobile telephone service by installing a number of base stations, each positioned to provide service to a corresponding limited base station coverage area. If service demands are great, the base stations may be subdivided or sectorized into smaller coverage areas or more base stations may be added. For example, some major metropolitan areas currently have nearly 400 base stations.

In a further development of a cellular telephone system, it may be desired to provide a number of very small base stations, called microcells, which would provide coverage of a very limited geographic area. Usually, it is considered that such areas are limited to a single floor of an office building and the mobile telephone service can be viewed as a cordless telephone system that may or may not be compatible with the external mobile cellular telephone system. The rationale for providing such a service is similar to the reasoning for use of Private Branch Exchange (PBX) systems in business offices. Such systems provide for low cost phone service for a large number of calls between phones within the business while providing simplified dialing for internal phone numbers. A few lines are also provided to connect the PBX system to the public telephone system, allowing calls to be made and received between telephones in the PBX system and telephones located elsewhere. It is desirable for the microcell system to provide a similar level of service but with the added feature of cordless operation anywhere within the service area of the PBX.

In the indoor environment and other areas bound by large surfaces in close proximity, path delays are typically much shorter in duration than experienced in the outdoor communication system environment. In buildings and other indoor environments where communication systems are used, it may be necessary to provide an additional form of diversity which enables discrimination between multipath signals.

A communication system adapted for indoor environments is described in the above-referenced U.S. Pat. No. 5,280,472 (the '472 patent), which is assigned to the assignee of the present invention, and which is herein incorporated by reference. Among other things, the '472 patent describes an implementation of a distributed antenna system which utilizes a single or dual set of discrete antennas where each discrete antenna on a common strand is separated from its neighbor with a delay element.

Also there are other less confined environments where it is desirable to have a coverage area shape different from the standard circular or cone shape provide by standard base stations. Even a serially connected set of discrete antennas which make up a distributed antenna provides less than ideal coverage over some linearly shaped regions. For example, a busy highway is a high capacity demand area. If discrete antennas are provided along the highway, the signal level must be large next to the antennas to reach the areas between the antennas. The large signal level may cause harmful intermodulation problems close to the base station while providing inadequate signal levels at the boundaries of the coverage area. Another even more problematic example is a subway or highway tunnel. A tunnel provides a unique environment in that the propagation paths are greatly confined. The confined paths result in strong and durationally short multipath propagation paths which result in relatively fast, flat, broadband fading. The fast rate of fading prevents power control from effectively compensating if the time constant of the power control is slower than the rate of the fades. Also the inherent broadband nature of the fast fades prevents the frequency diversity of the broadband CDMA waveform from mitigating the effects of the fast rate fading.

In such environments, it is more desirable to have an antenna system which provides an elongated, constant signal strength coverage area. If a distributed antenna comprised of a set of discrete antennas is thought of as having an antenna pattern resembling the light pattern from a string of Christmas tree lights, a more ideal antenna pattern would be one which has a coverage area similar to that of a neon tube light. The ideal antenna structure would also provide some form of diversity which would survive even the most harsh environment such as the tunnel environment. The present invention provides both a uniform coverage area and a reliable form of diversity.

In the above-referenced copending U.S. patent application Ser. No. 08/112,392, which is also assigned to the assignee of the present invention and incorporated herein by reference, a technique is disclosed for improving performance of a distributed antenna system using parallel strings of discrete antennas, each antenna on a common string is separated from its neighbors by a delay element. Two antennas one from each parallel string are placed at each node to provide spatial diversity throughout the coverage area. Thus the mobile unit in general has a similar distance, and hence path loss, to pairs of collocated antennas. The discrete antenna elements may include frequency conversion circuitry, thus reducing the cabling path loss between the antenna elements and the base station and allowing the use of readily available SAW devices as delay elements. At each discrete antenna node, circuits may be used to provide gain and duplexing functions.

Unfortunately, the circuitry associated with each antenna node can be relatively expensive and may require DC power to operate. Any cabling path loss occurring between nodes further increases DC power requirements, particularly for distributed antennas of appreciable length. Moreover, the accumulated delay associated with the SAW devices distributed along such lengthy systems may complicate efforts to achieve compliance with accepted telecommunications industry standards (e.g., IS-95).

It is a principal object of the present invention to provide a simple antenna system characterized by high capacity, simple installation, good coverage, and low susceptibility to multipath fading. The antenna system of the present invention advantageously provides these features without requiring DC power, and facilitates compliance with industry standards by creating less accumulated delay for a given length of antenna.

SUMMARY OF THE INVENTION

In a preferred embodiment of the present invention, two linear coverage area antenna structures coupled to a base station are positioned in parallel to create a linear coverage area antenna system. Within the base station, a transmitter generates mobile unit directed (forward link) spread spectrum signals. The forward link signals are provided to both linear coverage area antenna structures through an antenna interface. The antenna interface includes a time delay element for introducing a time delay between the signal transmitted on each linear coverage area antenna structure. Also in the preferred embodiment, the base station also further includes a first receiver for demodulating a plurality of base station directed (reverse link) spread spectrum signals received by a first one of the linear coverage area antenna structures and a second receiver for demodulating a plurality of reverse link spread spectrum signals received by the second one of the linear coverage area antenna structures.

An advantage afforded by the present invention is that little site specific engineering is required for installation. Antenna placement is determined by physical constraints of the environment requiring service. There is no concern for precise overlapping of coverage area of the two linear coverage area antenna structures. Overlapping coverage is beneficial but is not required.

The benefits of the linear coverage area antenna structures are clear when considering the inherent simplicity of the base station equipment required to support communications of the type such as cellular telephone, PCS, wireless PBX, wireless local loop, or wireless home extension telephone.

BRIEF DESCRIPTION OF THE DRAWINGS

The features, objects, and advantages of the present invention will become more apparent from the detailed description set forth below when taken in conjunction with the drawings.

DETAILED DESCRIPTION OF THE PREFERRED EMBODIMENTS

A single set of antennas and delay elements provides the most basic implementation of the distributed antenna function. Details of the single set of antennas are disclosed in the '472 patent mentioned above. Rather than prescribing use of a set of discrete antennas, the present invention contemplates employment of linear coverage area antenna structures.

Figure 1A:
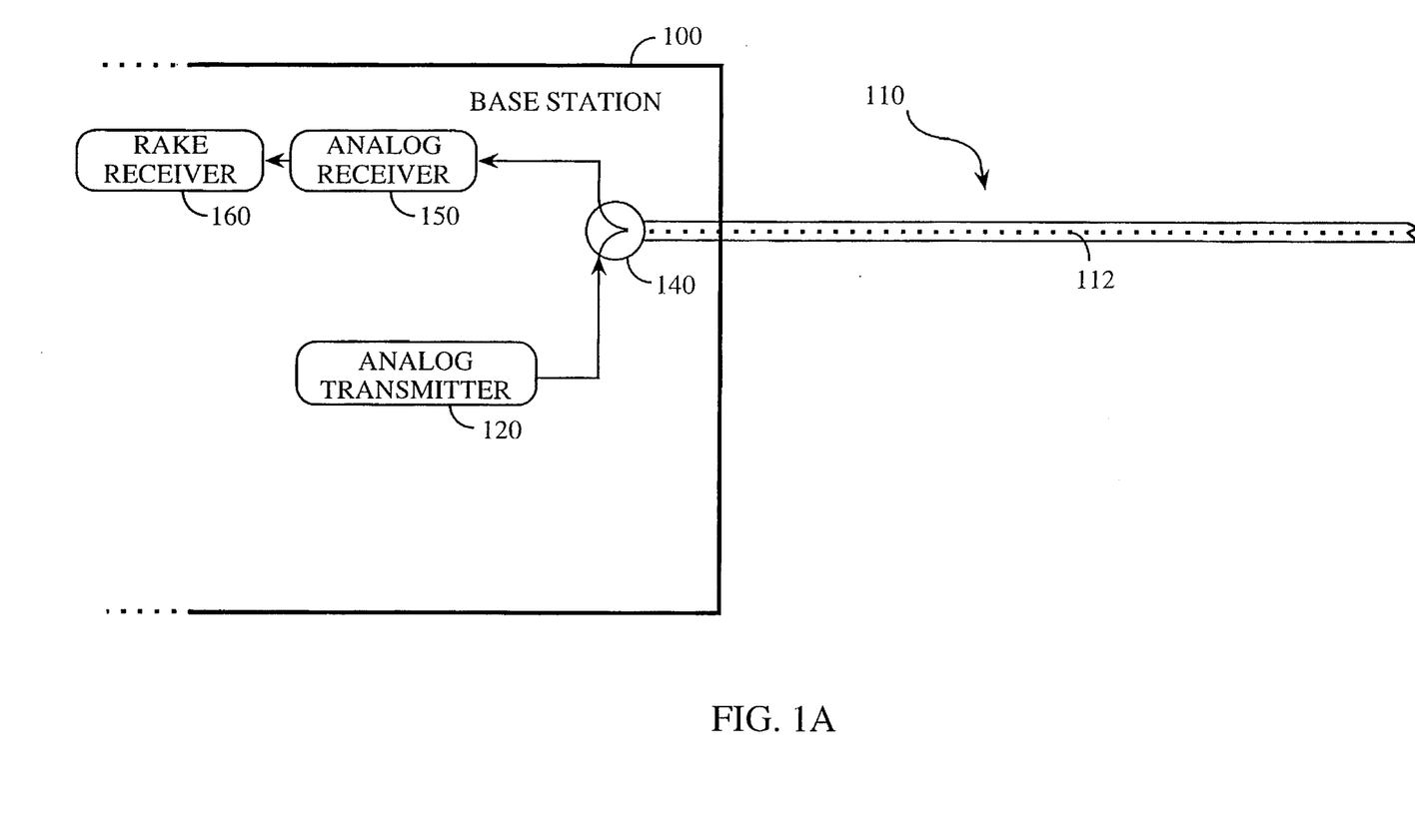
FIGS. 1A and 1B are block diagrams of a single linear coverage area antenna structure of the present invention.
Figure 1B:
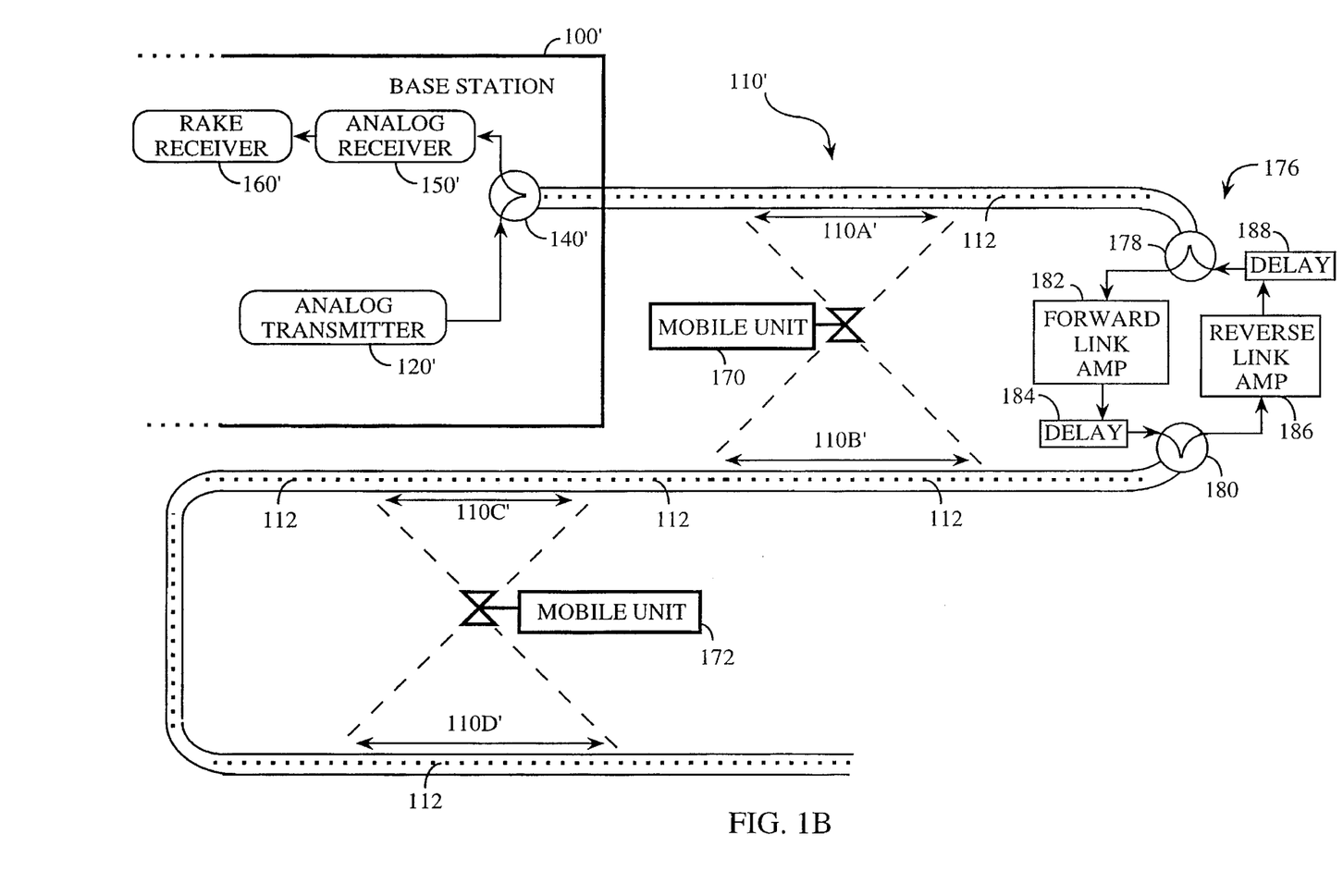

FIGS. 1A and 1B illustratively represent exemplary configurations of a single linear coverage area antenna structure of the present invention. The linear coverage area provided in FIGS. 1A and 1B would be useful in systems deployed in tunnels, on ships, or down hallways. In FIG. 1A, base station 100 provides signals to and accepts signals from linear coverage area antenna structure 110. Although any antenna which provides a linearly shaped continuous coverage area can be used in conjunction with the present invention, in the preferred embodiment linear coverage area antenna structure 110 may comprise a coaxial radiating antenna cable in which small slots 112 are located along the length of the outer coaxial conductor at regular intervals. Slots 112 allow a controlled portion of the radio frequency (RF) energy from linear coverage area antenna structure 110 to be radiated into, and received from, the surrounding environment. An exemplary coaxial antenna cable suitable for use as linear coverage area antenna structure 110 is the FLEXWELL Radiating Cable produced by Radio Frequency Systems, Inc., of North Haven, Conn. Also commercially available is the RADIAX Radiating Coaxial Cable produced by ANDREW Corp. of the U.K. and Canada. An exemplary triaxial antenna cable from which linear coverage area antenna structure 110 may be realized is the nu-TRAC Triaxial Antenna Cable manufactured by Times Microwave Systems of Wallingford, Conn.

Within base station 100, analog transmitter 120 produces the forward link RF signals for transmission by linear coverage area antenna structure 110. The forward link RF signals are coupled to linear coverage area antenna structure 110 by a duplexer 140. Similarly, reverse link RF signals received by linear coverage area antenna structure 110 from remote units (not shown) are passed by duplexer 140 to analog receiver 150, which accepts the incoming reverse link RF signals for processing.

Linear coverage area antenna structure 110 may receive multipath components of the same reverse link RF signals. The above mentioned patents and copending patent applications disclose a cellular telephone system that uses CDMA modulation with a 1.25 MHz bandwidth, multiple forms of diversity, and transmit power control. One method of exploiting diversity is the provision of a "rake" receiver architecture in which multiple demodulation elements are provided, each capable of receiving a signal that has traveled a different path and therefore exhibits a different delay.

In the present invention, the multipath diversity, both naturally occurring and introduced by design, between signals incident on linear coverage area antenna structure 110 may be exploited by incorporating rake receiver 160 within base station 100. Rake receiver 160, coupled to analog receiver 150, includes at least one demodulation element (not shown). However, in order to take full advantage of the functionality of rake receiver 160 it is preferred that two or more demodulation elements, e.g. typically three or four, be employed. Further details of an exemplary embodiment of a rake receiver are provided in U.S. Pat. No. 5,103,459 and U.S. Pat. No. 5,109,390.

Referring now to FIG. 1B, the schematic block diagram of FIG. 1A is expanded in FIG. 1B to contain geographical aspects. In FIG. 1B, linear coverage area antenna structure 110' is arranged in a manner intended to facilitate diversity reception of signals transmitted by the mobile units. Such a nonlinear placement of linear coverage area antenna structure 110' might also result from placement though allies or within parallel halls in a building. In FIG. 1B linear coverage area antenna structure 110' is configured such that the reverse link signals transmitted by first mobile unit 170, equipped with a conventional omnidirectional antenna, impinge upon first and second antenna segments 110A' and 110B'. Similarly, the reverse link signal transmitted by second mobile unit 172 is received over third and fourth antenna segments 110C' and 110D' of linear coverage area antenna structure 110'. Complementary diversity is achieved within first and second mobile units 170 and 172 with respect to the forward link signal radiated from first and second antenna segments 110A', 110B', and from third and fourth antenna segments 110C' and 110D', respectively.

In CDMA systems, time diversity between delayed versions of a given signal may be exploited if the intervening time interval exceeds the period of a single "chip" of the pseudorandom noise (PN) code used to modulate the given signal. Hence, to ensure that time diversity is maintained with respect to communication with first mobile unit 170 and first and second antenna segments 110A', 110B', linear coverage area antenna structure 110' can be arranged such that a signal propagation delay of more than one PN code chip exists between the first and second antenna segments 110A' and 110B'. Likewise, the signal propagation delay between the third and fourth antenna segments 110C' and 110D' should also exceed the period of one PN code chip to establish time diversity with respect to communication with second mobile unit 172.

If the nonlinear arrangement of linear coverage area antenna structure 110' does not yield a delay of at least one PN code chip between the first and second antenna segments 110A' and 110B' delay elements may be placed in linear coverage area antenna structure 110' in order to achieve the requisite diversity delay. The embodiment of FIG. 1B may optionally also include one or more amplifier module(s) 176 for amplifying the power of the reverse link and forward link signals. Each amplifier module 176 includes a pair of duplexers 178 and 180 to which are connected forward link amplifier 182 and first delay element 184 as well as reverse link amplifier 186 and second delay element 188. Duplexers 178 and 180 couple reverse link signals within the reverse link frequency band to/from the reverse link amplifier 186, and couple forward link signals within the forward link frequency band to/from the forward link amplifier 182. Forward and reverse link amplifiers 182 and 186 serve to maintain adequate signal power levels if linear coverage area antenna structure 110' is of relatively long length. In CDMA systems, first and second delay elements 184 and 188 each provide a delay (e.g., a delay equivalent to one PN code chip) sufficient to ensure the diversity transmission and reception of signals by the segments of linear coverage area antenna structure 110' on either side of amplifier module 176. In an alternative embodiment, passive delay elements could be added within linear coverage area antenna structure 110' without the additional application and duplexing functions of amplifier module 176.

In alternately preferred embodiments of the present invention a dual set of linear coverage area antenna structures is used to alleviate the service quality reductions occasionally experienced by single linear coverage area antenna structures. In the case of the system of the aforementioned '472 patent, the effects of multipath fading may cause a momentary degradation of service if a mobile unit is positioned in close proximity to a first discrete antenna and positioned at some great distance from the other more distant discrete antennas. Under this condition the mobile unit transmits enough power to communicate with the first discrete antenna but not enough power to communicate reliably with the distant discrete antennas. If under this condition the mobile unit were to abruptly experience a severe multipath fade with respect to the first discrete antenna, the reduced signal level at the first discrete antenna and the low signal level at the distant discrete antennas may cause a degradation in service. Communication between the base station and the mobile unit would be sub-optimal until the power control loop increased the transmit power from the mobile unit or until the mobile unit environment changed to alleviate the multipath fading. As was mentioned above, such sub-optimal performance can be mitigated by placing two discrete antennas at each node in the manner described in copending application Ser. No. 08/112,392. The two collocated discrete antennas are placed far enough apart such that they exhibit independence in multipath fading but close enough together such that the signal levels are similar with respect to a mobile unit. Thus if a mobile unit experiences a fade with respect to one antenna, the other collocated antenna provides a reliable path of similar power requirements.

Rather than using a dual set of discrete antennas, in a preferred embodiment the present invention achieves robust performance in the presence of multipath fading by providing a pair of linear coverage area antenna structures arranged with substantially overlapping coverage areas to form a linear coverage area antenna system. The pair of linear coverage area antenna structures are arranged such that each linear coverage area antenna structure has similar power requirements from a mobile unit within the coverage area but each provides independent fading with respect to the same mobile unit. Typically the linear coverage area antenna structures are placed between 1 and 10 wavelengths apart, and in a presently preferred embodiment approximately 5 wavelengths apart (i.e., about 30 inches apart at the proposed personal communications system (PCS) frequencies of approximately 1800 MHz), in order to obtain path diversity and thus independence in fading.

Figure 2:
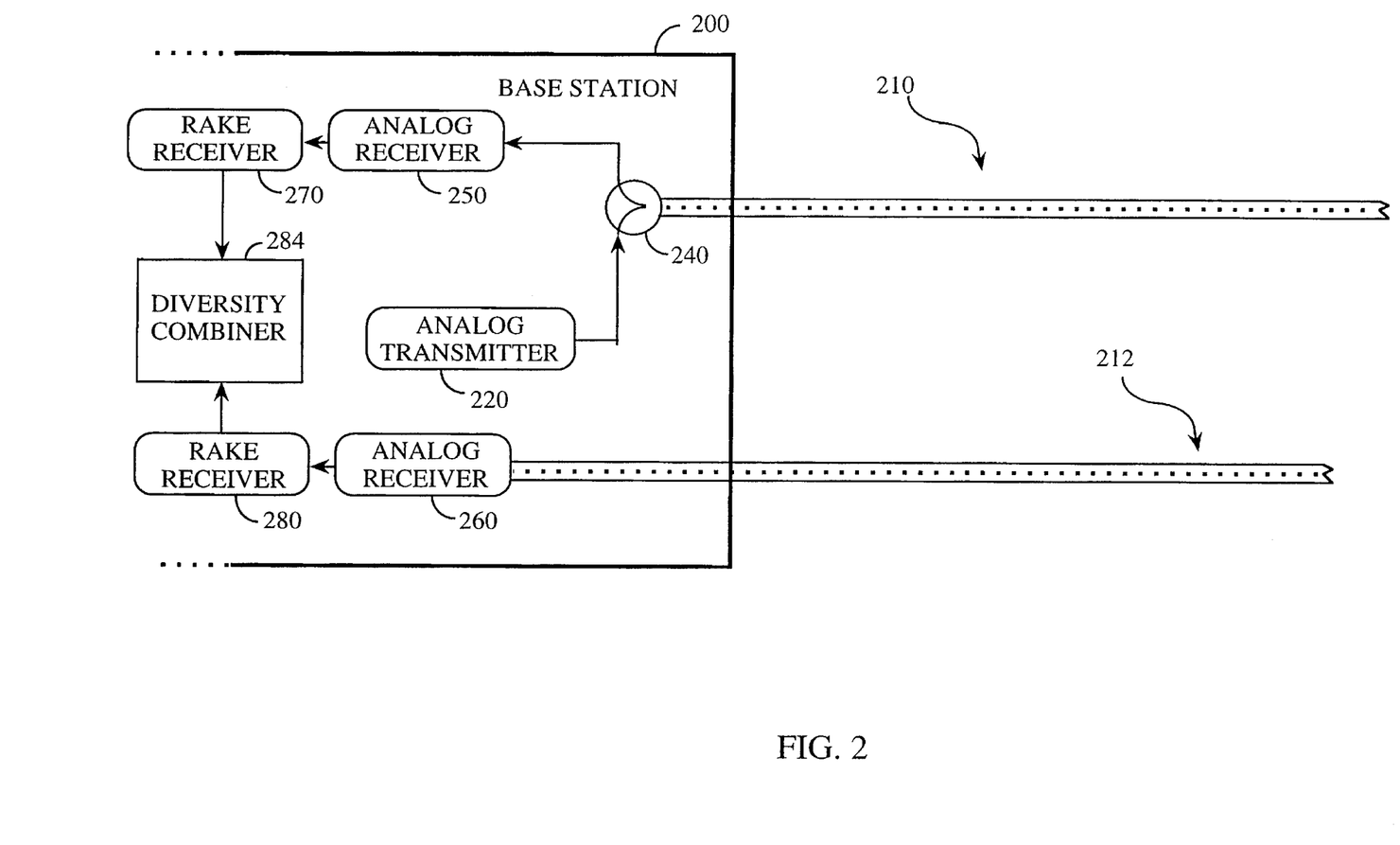
FIG. 2 is a block diagram of a linear coverage area antenna system comprised of two linear coverage area antenna structures disposed to provide spatial diversity on the reverse link signals.

Turning to FIG. 2, there is shown a linear coverage area antenna system disposed to provide spatial diversity in reception of reverse link signals. In FIG. 2, base station 200 provides signals to, and accepts signals from, first linear coverage area antenna structure 210. In addition, base station 200 accepts signals from second linear coverage area antenna structure 212. First and second linear coverage area antenna structures 210 and 212 are positioned to provide the advantages detailed above. Although the preferred embodiment envision the use of two linear coverage area antenna structures, three or more could be used within the scope of the present invention. In addition, the geographical aspects of FIG. 1B could be incorporated into either or both of first or second linear coverage area antenna structures 210 or 212. Likewise amplifier module 176 could be incorporated into either or both of first or second linear coverage area antenna structures 210 or 212.

Within base station 200, analog transmitter 220 produces the forward link RF signals for transmission by linear coverage area antenna structure 210. The forward link RF signals are coupled to first linear coverage area antenna structure 210 by duplexer 240. Similarly, reverse link RF signals received by linear coverage area antenna structure 210 from the mobile units (not shown) are passed by duplexer 240 to first analog receiver 250. Rake receiver 270 includes at least one demodulation element (not shown) and preferably includes two or more demodulation elements.

In like manner, the reverse link RF signals received by second linear coverage area antenna structure 212 are processed by second analog receiver 260. Second rake receiver 280 processes signals received by the second analog receiver 260 from second distributed antenna structure 212. Rake receiver 280 includes at least one demodulation element (not shown) and preferably includes two or more demodulation elements.

The outputs of first and second rake receivers 270 and 280 are provided to diversity combiner and decoder circuitry 284. Diversity combiner and decoder circuitry 284 combines and decodes the output of first and second rake receivers 270 and 280. The decoded data is then further processed within digital baseband circuitry (not shown). Combination of the resultant digital bits as contemplated by the embodiment of FIG. 2 affords several advantages. These include, for example, decreased error rates due to the coherent combining and a reduction in fluctuations in power level from the mobile unit. Both of these factors lead to higher capacity and improved system performance.

Figure 3:
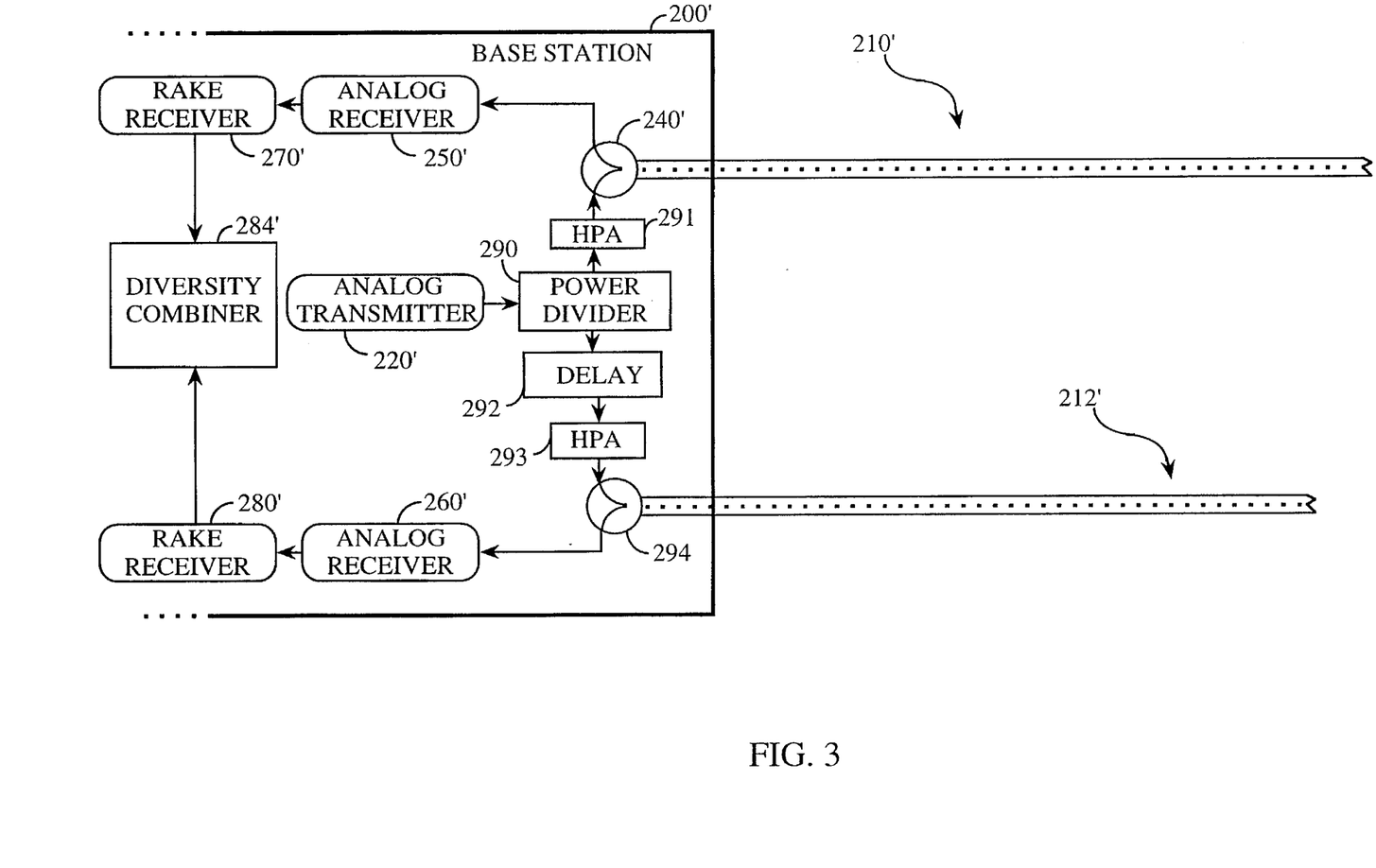
FIG. 3 is a block diagram of linear coverage area antenna structures capable of providing spatial diversity with respect to both the forward and reverse link.

Turning now to FIG. 3, a block diagram is shown of a linear coverage area antenna system which provides diversity respect to forward link signals. Note that diversity on the reverse link is provided by the physical separation of the two linear coverage area antenna structures. In the preferred embodiment, each linear coverage area antenna structure is coupled to a different receiver such that the signals from each linear coverage area antenna structure are not combined at RF. Thus it is not required that signals from each linear coverage area antenna structure are delayed by more than 1 PN chip time in order to be resolved. If the delays from the mobile unit to each linear coverage area antenna structure were identical, a signal from each linear coverage area antenna structure could be still resolved. However the same is not true of the forward link. Typically a mobile unit is not provided with two antennas and two separate RF/analog receivers due to economic, ergonomic, and implementation issues. Thus if the same forward link signal is transmitted from each linear coverage area antenna structure, a mobile unit which receives a signal from each linear coverage area antenna structure can only resolve the two signals if they are separated in time by the minimum one PN chip time. (Further details of the mobile unit architecture are given below.) Therefore, it is desirable to provide a forward link with the diversity characteristics described above without providing dual receive paths at the mobile unit.

One elegant solution is to provide diversity in the transmission path of the forward link such that the ability to resolve signals from each linear coverage area antenna structure is inherent in the signal as received by the mobile unit. Transmission diversity can be achieved by delaying the signal transmitted from one of the linear coverage area antenna structures as compared to the signal transmitted from the other linear coverage area antenna structure. By introducing delay between the two signals, a mobile unit which receives a signal from each linear coverage area antenna structure with the same natural delay is able to resolve the two signals because of the introduced delay. An embodiment having such diversity introduced on the forward link is shown in FIG. 3. Given the similarity between the embodiments of FIGS. 2 and 3, primed reference numerals are used in FIG. 3 to identify structures corresponding to those depicted in FIG. 2.

Base station 200' of FIG. 3 includes a power divider 290 for splitting the signal from analog transmitter 220'. One of the signal components output by power divider 290 is amplified by first high power amplifier (HPA) 291, and the amplified output provided to duplexer 240' for transmission by linear coverage area antenna structure 210'. The other signal component is provided to delay element 292, which introduces a delay (e.g., one PN chip) sufficient to ensure that time diversity exists between the signals radiated by first and second linear coverage area antenna structures 210' and 212'. For an exemplary PN chip rate of 1.25 MHz, the delay provided by delay element 292 may be on the order of 0.5 to 3 microseconds. The delayed signal from delay element 292 is amplified by second HPA 293, and the amplified output coupled to second linear coverage area antenna structure 212' by duplexer 294. As a result of the path and time diversity provided by the antenna systems described above, the multiple demodulation element architecture of the mobile units can demodulate the signal from each linear coverage area antenna structures separately.

The mobile units contain one or more data demodulation elements and a searcher element. The searcher element scans the time domain determining what paths exist and the magnitude of the paths. The available demodulation elements are then assigned to demodulate the signals traveling the most advantageous available paths.

Figure 4:
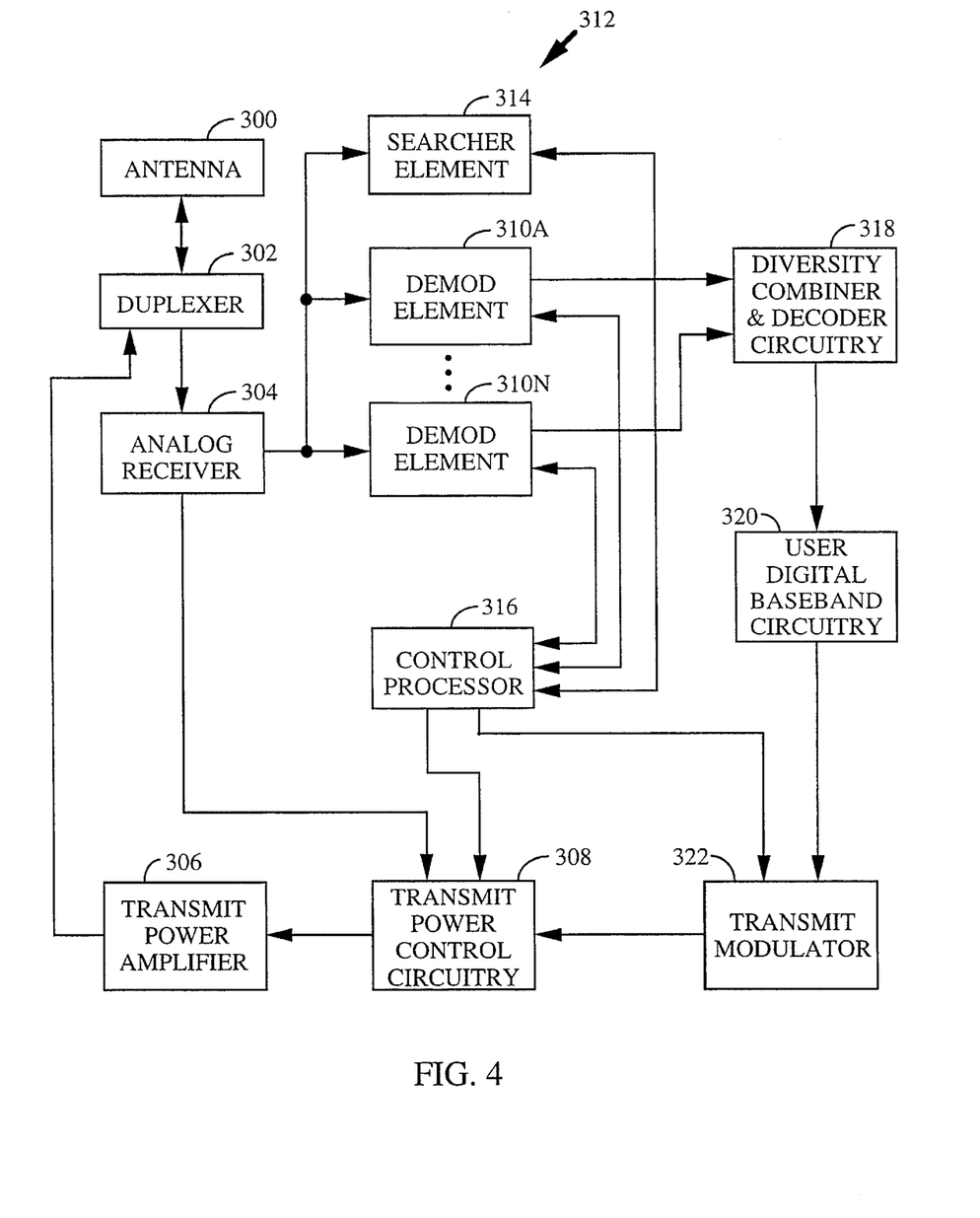
FIG. 4 is a block diagram of an exemplary implementation of a remote or mobile unit transceiver.

FIG. 4 illustrates in block diagram form an exemplary CDMA mobile unit. The mobile unit includes antenna 300 which is coupled through duplexer 302 to analog receiver 304 and transmit power amplifier 306. Analog receiver 304 receives the RF frequency signals from duplexer 302 for amplification and frequency downconversion. The signals are also filtered, digitized, and provided to demodulation elements 310A–310N along with searcher element 314 of rake receiver 312. Further details of an exemplary embodiment of analog receiver 304 and rake receiver 312 are illustrated in the above-mentioned U.S. Pat. Nos. 5,103,459 and 5,109,390.

Analog receiver 304 also performs a power control function used for adjusting the transmit power of the mobile unit. Analog receiver 304 generates an analog power control signal that is provided to transmit power control circuitry 308.

The digitized signal provided to demodulation elements 310A–310N and searcher element 314 at the output of analog receiver 304 may contain the signals of many ongoing call signals intended for other mobile units together with the base station pilot signals. Each demodulation element 310A–310N is assigned to demodulate a different diversity signal of the same forward link signal. The diversity in the signals may be naturally occurring multipath or the introduced diversity such as from the linear coverage area antenna system shown in FIG. 3. The function of demodulation elements 310A–310N is to correlate the samples with the proper PN sequence. This correlation process provides a property that is well-known in the art as "processing gain" which enhances the signal-to-interference ratio of a signal matching the proper PN sequence. Correlated output may be synchronously detected using the pilot carrier from the transmitting base station as a carrier phase reference. The result of this demodulation process is a sequence of encoded data symbols. Further information relating to decoding using a pilot sequence is disclosed in copending U.S. patent application Ser. No. 08/343,800, filed Nov. 21, 1994, and entitled "PILOT CARRIER DOT PRODUCT CIRCUIT" now U.S. Pat. No. 5,506,865 which is assigned to the assignee of the present invention.

Searcher element 314, under control of control processor 316 continuously scans the time domain in search of multipath pilot signals from a plurality of surrounding base stations. Searcher element 314 measures the strength of any pilot signal detected. Searcher element 314 provides a set of signal strengths and time offsets of the detected signals to control processor 316. Control processor 316 provides control signals to demodulation elements 310A–310N such that each one processes a different one of the most advantageous signals. A method of assigning demodulation elements to process different signals based on a searcher element's output is disclosed in copending U.S. patent application Ser. No. 08/144,902, filed Oct. 28, 1993, entitled "DEMODULATION ELEMENT ASSIGNMENT IN A SYSTEM CAPABLE OF RECEIVING MULTIPLE SIGNALS" now U.S. Pat. No. 5,940,165, which is assigned to the assignee of the present invention.

The output of demodulation elements 310A–310N is provided to diversity combiner and decoder circuitry 318. Diversity combiner and decoder circuitry 318 combines the output of demodulation elements 310A–310N into an aggregate signal for further processing. It is this combination process that allows the system to take advantage of the diversity by summing the energy from each of demodulation elements 310A–310N. The resulting aggregate signal stream may be decoded using a forward error correction (FEC) decoder also contained within diversity combiner and decoder circuitry 318.

User digital baseband circuitry 320 typically includes a digital vocoder (not shown) which may be a variable rate type. User digital baseband circuitry 320 further serves as an interface with a handset or any other type of peripheral device (not shown). User digital baseband circuitry 320 provides output information signals to the user in accordance with the information provided thereto from diversity combiner and decoder circuitry 318.

On the reverse link, user analog voice signals are typically provided through a handset as an input to user digital baseband circuitry 320. User digital baseband circuitry 320 includes an analog to digital (A/D) converter (not shown) which converts the analog signal to digital form. The digital signal is provided to the digital vocoder where it is encoded. The vocoder output is provided to a forward error correction (FEC) encoding circuit (not shown). In the exemplary embodiment the error correction encoding implemented is of a convolutional encoding scheme. The digitized encoded signal is output from user digital baseband circuitry 320 to transmit modulator 322.

Transmit modulator 322 encodes the transmit data, which in the exemplary embodiment is a 64-ary orthogonal signaling technique based upon Walsh codes, and then modulates the encoded signal on a PN carrier signal. Control processor 316 provides the PN sequence alignment information to transmit modulator 322. Further details on data modulation are disclosed in aforementioned U.S. Pat. No. 5,103,459.

Transmit modulator 322 further converts the modulated signal to analog form for modulating upon an intermediate frequency (IF) carrier. The IF signal output from transmit modulator 322 is provided to transmit power control circuitry 308. Transmit power control circuitry 308 controls the transmission signal power based on an analog power control signal provided from analog receiver 304. Also control bits transmitted by the base station in the form of power adjustment commands are processed by demodulation elements 310A–310N and provided to control processor 316. In response to these commands, control processor 316 generates a second power control signal that is provided to transmit power control circuitry 308. Further information on the relationship of receiver 312, control processor 316 and transmit power control circuitry 308 with respect to power control is available in the above-mentioned U.S. Pat. No. 5,056,109.

Transmit power control circuitry 308 outputs the power controlled modulated signal to transmit power amplifier circuitry 306. Transmit power amplifier circuitry 306 converts the IF signal to an RF frequency. Transmit power amplifier circuitry 306 includes an amplifier which amplifies the signal to a final output level. The transmission signal is output from transmit power amplifier circuitry 306 to duplexer 302. Duplexer 302 couples the signal to antenna 300 for transmission to the base station.

Figure 5:
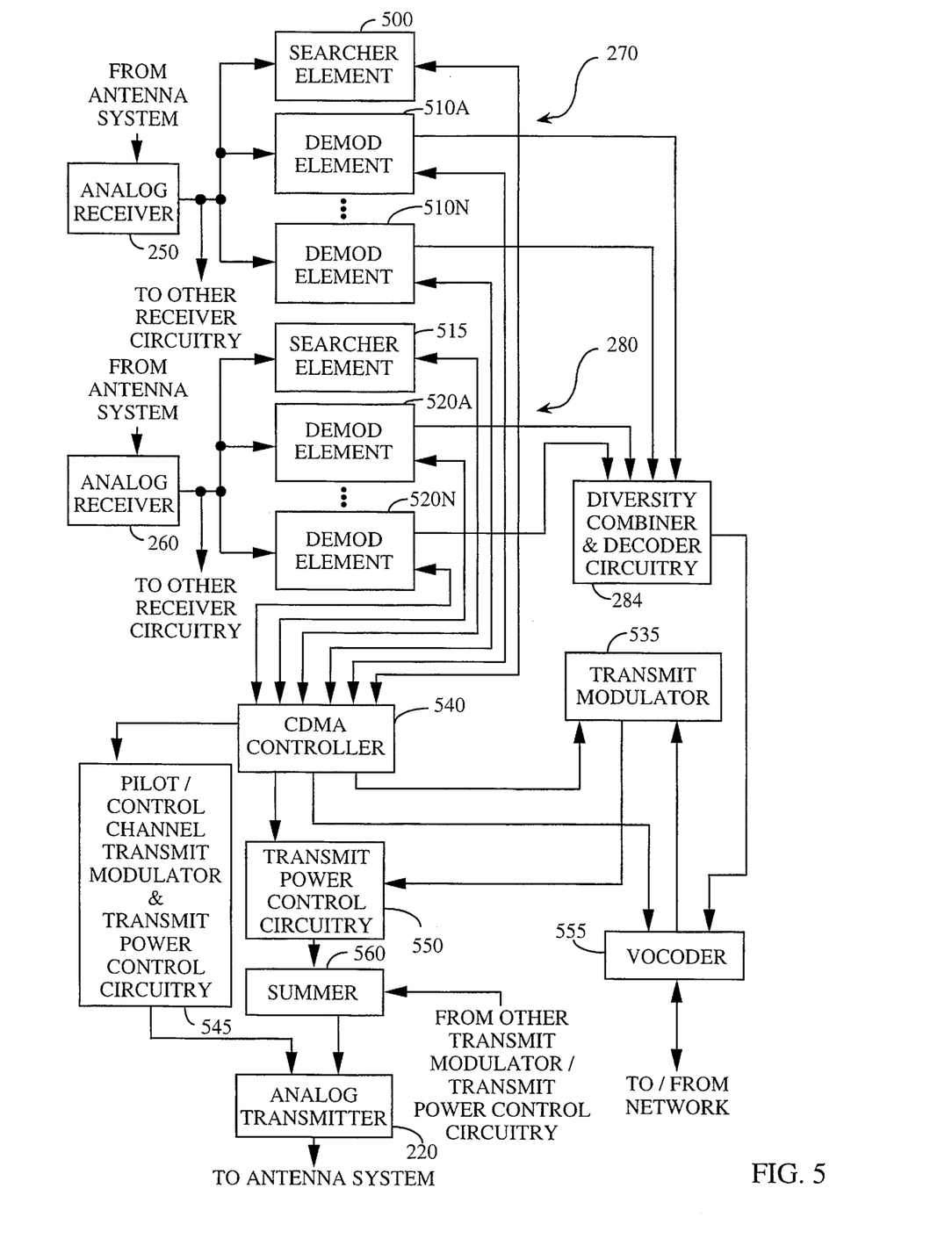
FIG. 5 is a block diagram of an exemplary base station.

FIG. 5 illustrates more completely in block diagram form the exemplary base station 200 of FIG. 2. In FIG. 5, like reference numerals are used to identify base station components corresponding to those depicted in FIG. 2. The receiver system of base station 200 is comprised of analog receivers 250 and 260 and also of rake receivers 270 and 280. Rake receiver 270 includes independent searcher element 500 and demodulation elements 510A–510N. Similarly, rake receiver 280 includes independent searcher element 515 and demodulation elements 520A–520N. As is indicated by FIG. 5, demodulation elements 510A–510N and 520A–520N are coupled to diversity combiner & decoder circuitry 284.

Referring to FIG. 5, analog receivers 250 and 260 respectively output a digitized version of composite signals formed from the transmissions of one or more mobile units. Searcher elements 500 and 515 each track the multipath propagations of an individual mobile unit's transmissions. Each demodulation element 510A–510N and 520A–520N is assigned to demodulate a particular multipath propagation of the same encoded message data from a common mobile unit. The output of analog receivers 250 and 260 is also provided to other rake receivers for tracking and demodulating signals transmitted by other mobile units. For further details see, for example, aforementioned U.S. patent application Ser. No. 08/144,902.

The base station of FIG. 5 includes CDMA controller 540 which is coupled to demodulation elements 510A–510N and 520A–520N along with searcher elements 500 and 515. CDMA controller 540 provides Walsh sequence and code assignment, signal processing, timing signal generation, power control and various other related functions.

Signals received by first linear coverage area antenna structure 210 are provided to analog receiver 250 and then to searcher element 500. Searcher element 500 is used to scan the time domain to detect the most advantageous available signals associated with a particular mobile unit. Searcher element 500 provides information about the detected signals to CDMA controller 540 which in response generates and provides control signals to demodulation elements 510A–510N for selecting the appropriate received signal for processing.

Signals received by the second linear coverage area antenna structure 212 are provided to analog receiver 260 and then to demodulation elements 520A–520N. Searcher element 515 is also used to scan the time domain about the received signal to ensure that demodulation elements 520A–520N are tracking and processing the most advantageous available signals associated with a particular mobile unit in the same manner as rake receiver 270. The output of demodulation elements 510A–510N and 520A–520N are then processed for optimal performance by diversity combiner and decoder circuitry 284.

Referring again to FIG. 5, searcher element 500 and demodulation elements 510A–510N, receive the composite signal output from analog receiver 250. In order to decode the spread spectrum signals transmitted by a single mobile unit, the proper PN sequences must be generated. Further details on the generation of the mobile unit signals are in U.S. Pat. No. 5,103,459.

Signals from an external or internal network, such as a private branch exchange (PBX), are coupled to the appropriate vocoder 555 under control of CDMA controller 540. Transmit modulator 535 which under control of CDMA controller 540 spread spectrum modulates the data for transmission to the intended recipient mobile unit. Transmit modulator 535 is assigned to encode and modulate data intended for transmission to the particular mobile unit to which rake receivers 270 and 280 are assigned. Transmit modulator 535 modulates the vocoder data with an orthogonal code selected from a set of orthogonal codes with the signal then modulated with a PN spreading code. The PN spread signal is then converted to analog form and provided to transmit power control circuitry 550.

Transmit power control circuitry 550 under the control of CDMA controller 540 controls the transmission power of the signal. The output of circuitry 550 is provided to summer 560 where it is summed with the output of transmit modulator/transmit power control circuits corresponding to other mobile units. The output of summer 560 is provided to analog transmitter 220. Analog transmitter 220 amplifies the signal for output via the linear coverage area antenna system for radiation to the mobile units within the base station coverage area. Further details on exemplary transmitter circuitry of FIG. 5 are illustrated in U.S. Pat. No. 5,103,459.

FIG. 5 further illustrates pilot/control channel generators and transmit power control circuitry 545. Circuitry 545 under control of CDMA controller 540 generates and controls the power of the pilot signal, the sync channel, and the paging channel for coupling to analog transmitter 220.

Figure 6:
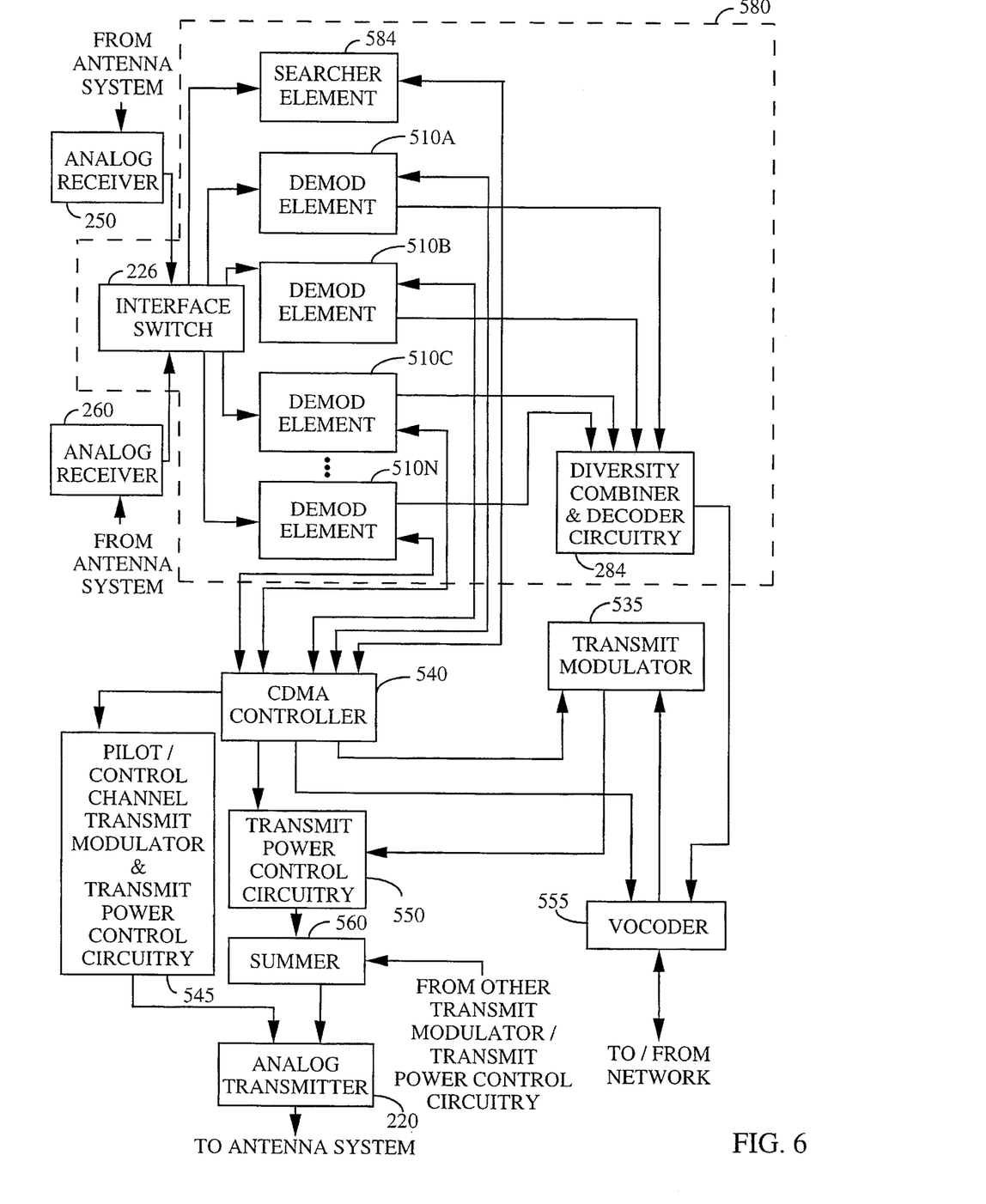
FIG. 6 depicts the architecture of a base station which incorporates a cell site modem (CSM) application specific integrated circuit (ASIC) chip for performing searching, receiving, combining, and decoding functions.

FIG. 6 depicts the architecture of a base station which incorporates a cell site modem (CSM) application specific integrated circuit (ASIC) chip 580 for performing searching, demodulating, combining, and decoding functions. In FIG. 6, like reference numerals are employed to identify functional elements corresponding to those of FIG. 5. CSM ASIC chip 580 includes a particularly efficient searcher engine 584 to perform the searching function required for each mobile unit call as described in copending U.S. patent application Ser. No. 08/316,177, filed Sep. 30, 1994, entitled "MULTIPATH SEARCH PROCESSOR FOR A SPREAD SPECTRUM MULTIPLE ACCESS COMMUNICATION SYSTEM", which is assigned to the assignee of the present invention. Briefly, the searcher engine 584 identifies the most advantageous available time domain signals associated with a particular mobile unit by monitoring the output of both analog receivers 250 and 260. This information is provided to CDMA controller 540, which instructs interface switch 226 to connect demodulation elements 510A–510N to analog receiver 250 or 260 according to which is producing the most advantageous available signal. Accordingly, the architecture of FIG. 6 enhances efficiency by enabling each demodulation element 510A–510N to be connected to the analog receiver offering the most advantageous signal.

Referring to FIG. 6 in greater detail, analog receivers 250 and 260 process the RF signal and convert the signal to digital bits. Analog receivers 250 and 260 each provide a resultant filtered bit stream to interface switch 226. Interface switch 226, under the control of CDMA controller 540, connects the filtered bit streams from one or both of analog receivers 250 and 260 to demodulation elements 510A–510N and searcher engine 585.

The preferred embodiment of FIG. 6 depicts a CSM ASIC implementation in which analog receivers 250 and 260 produce digital signals, and in which interface switch 226 is a digital signal routing device. However, it is understood that this signal routing function could also be implemented using analog techniques. In such an analog implementation, analog receivers 250 and 260 would be configured to pass analog, rather than digital, signals to interface switch 226. In like manner interface switch 226 would incorporate analog circuitry suitable for providing the analog signals to the appropriate demodulation element. In this configuration, analog-to-digital conversion would take place within each demodulation element prior to further processing therein.

As is indicated by FIG. 6, demodulation elements 510A–510N are controlled by CDMA controller 540. CDMA controller 540 assigns each demodulation element 510A–510N to one of the plurality of information signals from a single mobile unit received by either one of the linear coverage area antenna structures operatively coupled to analog receivers 250 or 260. Demodulation elements 510A–510N each produce streams of data bits representative of an estimate of the data from the single mobile unit. An efficient digital data receiver architecture is described in copending U.S. patent application Ser. No. 08/372,632, filed Jan. 13, 1995, and entitled "CELL SITE DEMODULATOR ARCHITECTURE FOR A SPREAD SPECTRUM MULTIPLE ACCESS COMMUNICATION SYSTEM".

The diversity combiner and decoder circuitry 284 combines the bit stream from each demodulation element 510A–510N in order to produce a single estimate of the data received from the mobile unit. This combination may be effected through the use of, for example, a Dual Maxima Metric Calculation of the type described in copending U.S. patent application Ser. No. 08/083,110, filed Jun. 24, 1993, and entitled "NONCOHERENT RECEIVER EMPLOYING A DUAL MAXIMA METRIC GENERATION PROCESS" now U.S. Pat. No. 5,442,627. This copending application also particularly describes a noncoherent receiver designed to produce aggregate soft decision data. When such a noncoherent receiver is employed, diversity combiner and decoder circuitry 284 typically includes a Viterbi decoder for decoding the aggregate soft decision data. The decoded symbols are subsequently combined, and are passed to vocoder 555 for further processing.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a digital communication system in which at least one remote terminal is in communication with a base station using digitally modulated communication signals, said base station having an antenna system comprising:

a first linear coverage area antenna structure;

a second linear coverage area antenna structure; and antenna interface means for coupling said communication signals between said base station and said first and second linear coverage area antenna structures, said antenna interface means including means for splitting ones of said communication signals into first and second time-offset signal components for transmission by said first and second linear coverage area antenna structures, respectively.

2. The antenna system of claim 1 wherein said antenna interface means includes first and second duplexers, said first and second duplexers being interposed between an analog transmitter within said base station and said first and second linear coverage area antenna structures, respectively.

3. The antenna system of claim 2 wherein said antenna interface means includes a splitter and delay network and wherein said communication signals are generated by spread spectrum modulating information signals according to predetermined pseudorandom noise (PN) spreading codes each comprised of a predetermined sequence of binary chips each of a predetermined chip duration, said splitter and delay network providing a delay between said first and second time-offset signal components on an order of at least one chip duration.

4. The system of claim 1 wherein said first and second linear coverage area antenna structures respectively comprise first and second leaky coaxial antennas.

5. In a digital communication system in which system users communicate through a base station with remote system users, said remote system users communicating through said base station via a radio link therewith, said base station comprising:

a first linear coverage area antenna structure;

a second linear coverage area antenna structure;

transmitter means for generating remote user directed spread spectrum signals by spread spectrum modulating system user information signals; and antenna interface means for providing said remote user directed spread spectrum signals to said first and second linear coverage area antenna structures, said antenna interface means including means for introducing a predetermined time delay between components of said remote user directed spread spectrum signals transmitted by said first and second linear coverage area antenna structures, respectively.

6. The base station of claim 5 further comprising first means for demodulating a first aggregate spread spectrum signal coupled from said first antenna structure, said first aggregate spread spectrum signal being comprised of a plurality of system user directed spread spectrum signals received by said first linear coverage area antenna structure.

7. The base station of claim 6 further comprising second means for demodulating a second aggregate spread spectrum signal coupled from said second antenna structure, said second aggregate spread spectrum signal being comprised of a plurality of system user directed spread spectrum signals received by said second linear coverage area antenna structure.

8. The base station of claim 5 wherein said system user information signals are spread spectrum modulated according to predetermined pseudorandom noise (PN) spreading codes each comprised of a predetermined sequence of binary chips each of a predetermined chip duration, said predetermined time delay being on an order of at least one chip duration.

9. The base station of claim 5 wherein said first and second linear coverage area antenna structures respectively comprise first and second leaky coaxial antennas.

10. The base station of claim 5 wherein said first and second linear coverage area antenna structures are disposed to radiate electromagnetic energy substantially continuously along a longitudinal dimension thereof.

11. A system for transmitting a forward link spread spectrum modulated information signal and receiving a reverse link spread spectrum modulated information signal wherein said forward and reverse spread spectrum modulated information signals are generated by spread spectrum modulating information signals with pseudorandom noise codes each predetermined pseudorandom noise code comprised of a predetermined sequence of code chips each of a predetermined chip duration, said system comprising:

a first antenna structure having a linear coverage area;

a second antenna structure having a linear coverage area; and antenna interface means for providing said forward link spread spectrum modulated information signal to said first and second linear coverage area antenna structures, said antenna interface means including means for introducing a delay equivalent to at least one of said predetermined chip durations between components of said forward link spread spectrum modulated information signal transmitted by said first and second antenna structures, respectively;

wherein said linear coverage area of said first antenna structure and said linear coverage area of said second antenna structure substantially overlap.

12. The system of claim 11 further comprising a plurality of demodulation elements wherein a first one of said plurality of demodulation elements receives a first component of said reverse link spread spectrum signal from said first antenna structure and a second one of said plurality of demodulation elements receives a component of said reverse link spread spectrum signal from said second antenna structure.

13. The system of claim 12 wherein said first and second ones of said demodulation elements each demodulate a signal from a common remote user further comprising a diversity combiner for combining an output of said first one of said demodulation elements and an output of said second one of said demodulation elements.

14. The system of claim 13 further comprising a searcher engine for identifying multiple receptions of said signal from said common remote unit.

15. The system of claim 12 further comprising an interface switch for coupling a third one of said plurality of demodulation elements either to said component of said reverse link spread spectrum signal from said first antenna structure or to said component of said reverse link spread spectrums signal from said second antenna structure.

16. The system of claim 11 wherein said first antenna structure is a leaky coaxial cable.

17. The system of claim 11 wherein said first antenna structure is triaxial coax cable.

18. The system of claim 11 further comprising a remote unit located within said substantial overlap wherein said remote unit comprises a plurality of demodulation elements for demodulating a chosen forward link signal within said component of said forward link spread spectrum modulated information signal transmitted by said first antenna structure and for demodulating said chosen forward link signal within said component of said forward link spread spectrum modulated information signal transmitted by said second antenna structure, respectively.

19. In a digital communication system in which at least one remote terminal is in communication with a base station using digitally modulated communication signals, a method for effecting distributed transmission of said digitally modulated communication signals comprising the steps of:

providing a first linear coverage area antenna structure;

providing a second linear coverage area antenna structure; and splitting ones of said digitally modulated communication signals from said base station into first and second signal components of different time delay, and coupling said first and second signal components of said digitally modulated communication signals to said first and second linear coverage area antenna structures.

20. The method of claim 19 wherein said communication signals are generated by spread spectrum modulating information signals according to predetermined pseudorandom noise (PN) spreading codes each comprised of a predetermined sequence of binary chips each of a predetermined chip duration, further including the step of providing a delay between said first and second signal components of different time delay on an order of at least one chip duration.

21. In a digital communication system in which system users communicate through a base station with remote system users, said remote system users communicating through said base station via a radio link therewith, a method for effecting distributed transmission and reception of spread spectrum communication signals at said base station comprising the steps of:

providing a first linear coverage area antenna structure;

providing a second linear coverage area antenna structure;

generating remote user directed ones of said spread spectrum signals by spread spectrum modulating user information signals; and providing said remote user directed ones of said spread spectrum signals to said first and second linear coverage area antenna structures, and introducing a predetermined time delay between components of said remote user directed ones of said spread spectrum signals transmitted by said first and second linear coverage area antenna structures, respectively.

22. The method of claim 21 further including the step of demodulating a first aggregate spread spectrum signal coupled from said first antenna structure, said first aggregate spread spectrum signal being comprised of a plurality of system user directed ones of said spread spectrum signals received by said first linear coverage area antenna structure.

23. The method of claim 22 further including the step of demodulating a second aggregate spread spectrum signal coupled from said second antenna structure, said second aggregate spread spectrum signal being comprised of a plurality of system user directed ones of said spread spectrum signals received by said second linear coverage area antenna structure.

24. The antenna system of claim 21 wherein said first and second linear coverage area antenna structures are separated by greater than a wavelength of said spread spectrum communication signals while maintain substantially overlapping coverage areas.

25. In a digital communication system in which at least one remote terminal is in communication with a base station using digitally modulated communication signals, said base station having an antenna system comprising:

a first linear coverage area antenna structure conveying a digitally modulated communication signal and comprised of a first segment having a first segment coverage area and a second segment having a second segment coverage area; and a series element disposed between said first segment and said second segment and providing delay between said digitally modulated communication signal conveyed by said first segment and said digitally modulated communication signal conveyed by said second segment.

26. The antenna system of claim 25 wherein said series element provides amplification of said digitally modulated communication signal.

27. The antenna system of claim 25 wherein said first segment coverage area and said second segment coverage area overlap.

28. The system of claim 27 further comprising a remote unit located within said overlap of said first and second coverage areas wherein said remote unit comprises a plurality of demodulation elements for demodulating a chosen forward link signal within said digitally modulated communication signal conveyed by said first segment and for demodulating said chosen forward link signal within said digitally modulated communication signal conveyed by said second segment.

* * * * *